United States Patent

[11] 3,597,617

| [72] | Inventor | Robert E. Passaro<br>Stamford, Conn. |
|---|---|---|
| [21] | Appl. No. | 846,109 |
| [22] | Filed | July 30, 1969 |
| [45] | Patented | Aug. 3, 1971 |
| [73] | Assignee | Barnes Engineering Company<br>Stamford, Conn. |

[54] INFRARED THERMOGRAPH HAVING AN AUTOMATIC BRIGHTNESS CONTROL
7 Claims, 2 Drawing Figs.

[52] U.S. Cl. .................................................. 250/83.3 HP
                                                       250/83.3 H
[51] Int. Cl. ...................................................... G01n 21/34
[50] Field of Search ........................................... 250/83.3 H,
                                                       83.3 HP

[56] References Cited
UNITED STATES PATENTS

| 3,287,559 | 11/1966 | Barnes........................... | 250/83.3 X HI |
| 3,316,404 | 4/1967 | Cruse ............................ | 250/83.3 H |
| 3,320,420 | 5/1967 | Paglee .......................... | 250/83.3 H |
| 3,323,757 | 6/1967 | Cole.............................. | 250/83.3 X H |
| 3,359,557 | 12/1967 | Fow et al. ..................... | 250/83.3 X H |

*Primary Examiner*—Archie R. Borchelt
*Attorneys*—Joseph Levinson and Robert Ames Norton ABSTRACT: An infrared detector is scanned over a field of view generating an infrared video signal based on the intensity of the infrared radiation appearing in the field of view, which signal is utilized to provide a thermal image of the field of view. After sufficient amplification, the infrared video signal is fed to a peak detector which derives a signal based on the maximum or minimum signal level in the infrared video signal which is coupled to an error amplifier and reinserted in the processing channel for controlling the brightness of the scene to be displayed.

INVENTOR.
ROBERT E. PASSARO
BY Joseph Levinson
ATTORNEY

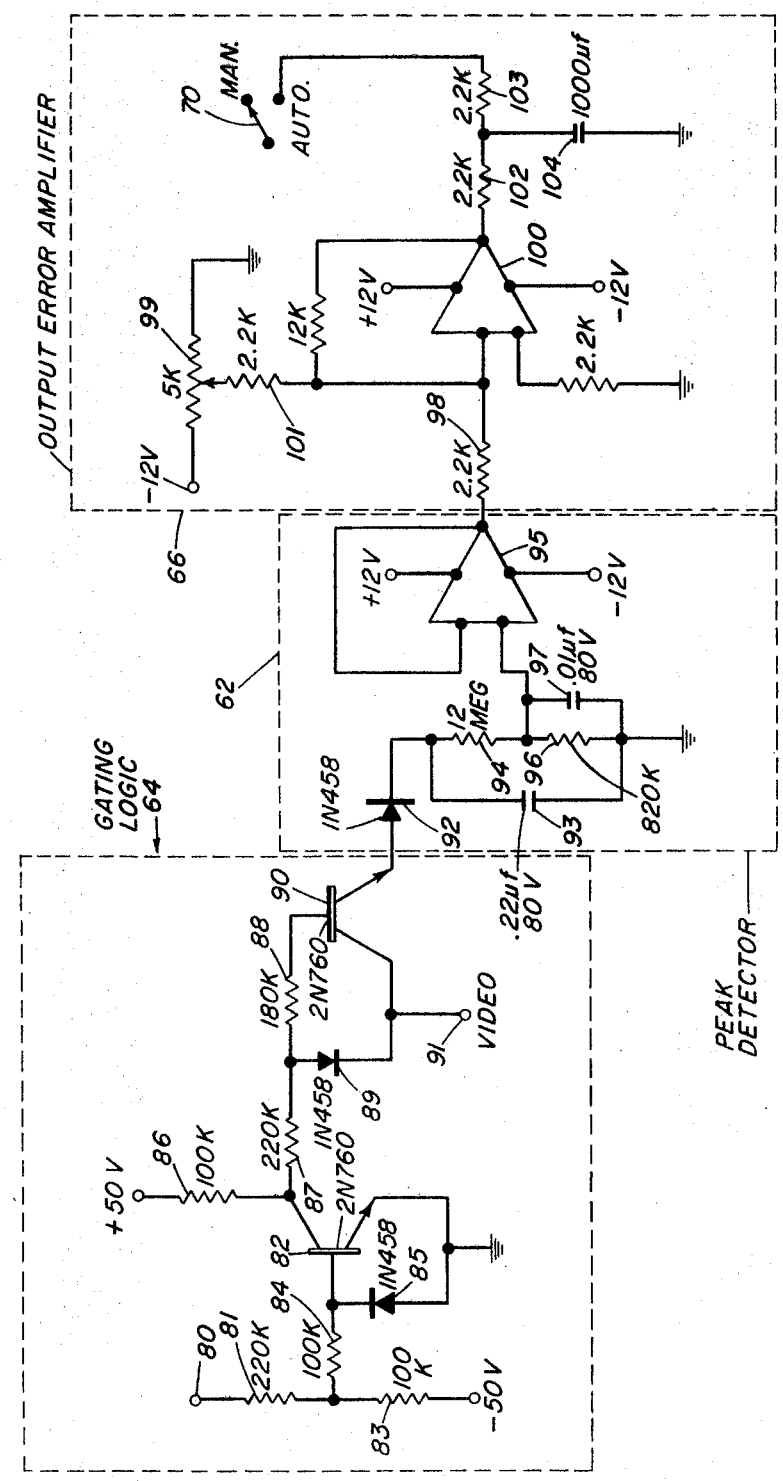

INFRARED THERMOGRAPH HAVING AN AUTOMATIC BRIGHTNESS CONTROL

BACKGROUND OF THE INVENTION

An infrared thermograph is an instrument for converting the infrared radiation from a field of view into a thermal image of that field of view. The infrared thermograph is comprised of an infrared detector which is scanned over a field of view in raster fashion, which generates a signal in electrical form containing the intensity information of the infrared radiation for the field of view. The thermograph is provided with a visual display or presentation of the infrared field. Since there is a definite correlation between the infrared radiation from the field of view and temperature, thermographs have been finding wide use in such fields as medical diagnosis, nondestructive testing, and many other industrial and military applications. The display of the thermograph is driven in synchronism with the scanning of the detector over the field of view to accurately reproduce a visual image on a display which may be in the form of a modulated light source scanning a photosensitive surface, or in the form of a cathode ray tube presentation which may be photographed to provide a permanent record of the field of view. After the preliminary adjustments of the thermograph, such as aiming and focusing of the optics which scan the detector over the field of view, an image is formed on the display. Before display, the signals generated by the infrared detector are processed, and the precessing circuitry usually contains a gain control which is adjusted, depending on the differences of temperature of the object in the field of view, to cause the temperature differences to fall within the dynamic range of the display. Accordingly, the gain control sets the range of temperatures that will be registered on the display. A manual brightness control is also contained, which at the operator adjusts, depending on the absolute infrared brightness of the subject. Identical temperature differences can occur at different absolute temperature levels. Accordingly, the brightness control sets the level of temperatures that will be registered on the display. If the brightness is not properly set, much of the infrared information coming from the field of view is lost. Since the brightness of the scene is constantly changing due to environmental conditions in the field of view, and also the temperature of the subject under observation, it is extremely difficult to manually set the brightness control such that the same high quality display can be reproduced when thermographing a different subject and, for that matter, the same subject after a time delay. With the manual brightness control, the quality of the display will depend on the accuracy of the operator to determine the brightness of the scene visually. This is extremely difficult, because the eye is not extremely accurate in judging variations in brightness, particularly when such differences are small.

Since temperature anomalies often occur at maximum and minimum temperatures of the subject which is being thermographed, thermography is particularly useful in pointing out these anomalies by searching for differences in temperature of the subject based on maximum and minimum levels. Accordingly, it is advantageous to have a thermograph display which shows the hottest or coldest portions of the subject and to make this function automatic so that no useful information is lost by an improper brightness control setting. Most important, however, is the fact that a major control function has been eliminated from the operator's hands.

Accordingly, it is an object of this invention to provide an automatic brightness control for an infrared thermograph.

SUMMARY OF THE INVENTION

An infrared thermograph is provided in which the infrared video signal is processed in order to adequately drive its associated display. After sufficient gain in the system, the peak of the infrared video signal is sampled, and a DC voltage proportional to this peak is produced and applied to an error amplifier. The DC output of the error amplifier is summed with the infrared video signal to automatically control the brightness of the scene.

BRIEF DESCRIPTION OF THE DRAWINGS

FIG. 2 is a schematic diagram of one form of infrared automatic brightness control circuit which may be utilized with the thermograph shown in FIG. 1.

DESCRIPTION OF THE INVENTION

Figure 1:
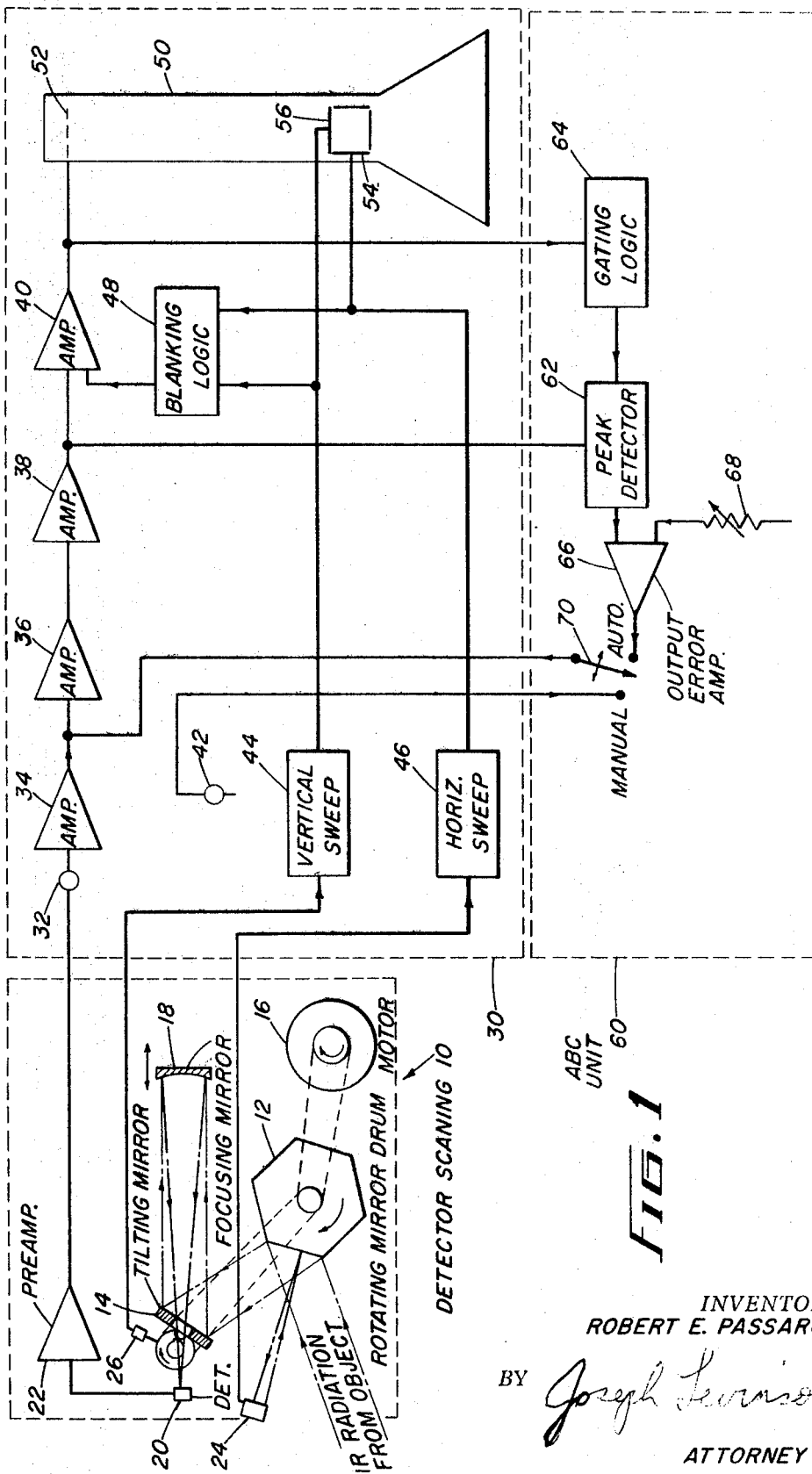
FIG. 1 is a block diagram of one form of infrared thermograph employing the automatic brightness control embodied in this invention.

The present invention is described in connection with the Bofors Infrared Camera model T-101, but it should be appreciated that the invention is not considered restricted thereto, and applies to all infrared thermographs in which the brightness control problem exists.

Referring now to FIG. 1, the infrared thermograph is divided into three units, the detector scanning unit 10, the electronic processing and display unit 30, and the automatic brightness control unit 60. The detector scanning unit 10 has an optical system comprised of a hexagonal rotating drum 12, a tilting mirror 14, and a concave focusing mirror 18. Infrared radiation from a field of view is applied to the rotating mirror drum 12 which deflects the radiation to tilting mirror 14. The rotating mirror drum 12 provides the horizontal scan, while the tilting mirror 14 provides the vertical scanning function. Both are driven by a motor 16. For each revolution of the rotating mirror drum, six lines are scanned, one for each of the drum's six faces. Radiation reflected from the sides of the rotating mirror drum 12 are reflected to the tilting mirror 12 which deflects the radiation to the concave focusing mirror 18. Mirror 18 then focuses incoming radiation onto an infrared detector 20. The infrared detector 20 provides a signal output which is modulated by the incoming radiation in intensity to provide an infrared video signal which is amplified by the preamplifier 22. Photodiode circuits 24 and 26 are positioned close to the mirror drum 12 and the tilting mirror 14, and serve the function of providing horizontal and vertical synchronizing pulses for the raster scan.

The infrared video signal from the preamplifier 22 is fed to the electronic processing and display unit 30, which includes a contrast control 32 for setting the overall system gain and accordingly the dynamic range of the thermograph system. The infrared video signal is amplified by a plurality of amplifiers 34, 36, 38 and 40, and applied to a control grid 52 of a cathode-ray tube 50, which forms the display. To reproduce the scanned field on the cathode ray tube 50 requires that the cathode-ray tube sweep be synchronized with the mechanical sweep of the field of view. Accordingly, horizontal triggering pulses from the photodiode circuit 24 are applied to a horizontal sweep generator 46 which is coupled to the horizontal deflection plates 54 of the cathode-ray tube 50. The horizontal sweep generator 46 is also coupled to the blanking logic 48. Likewise, for vertical synchronization the photodiode circuit 26 provides a vertical triggering pulse to the vertical sweep generator 44, which is coupled to the blanking logic 48 and to the vertical deflection plates 56 of the cathode ray tube 50. The blanking logic 48 is applied to the amplifier 40 to produce a composite infrared video signal at its output and on the control grid 52. These pulses act to blank out the cathode ray tube during nonscanning intervals at the corners of the mirror drum and at the end of the frame. The thermograph thus produces a system for the continuous display of thermal pictures from its field of view.

The thermograph also includes a brightness control 42 connected in the amplifier chain, in the present case to the input of amplifier 36, which control places a DC voltage in the amplifier chain which sets the black level for the display. As has been pointed out, with thermal images this is a difficult problem to do manually. It is desirable and in most cases essential to provide a consistent display which may be photographed, and to provide consistent quality where the picture is neither too dark nor too light. The problem is even more severe on infrared cameras where the display is made directly on film. Accordingly, an automatic brightness unit (ABC) 60 is provided which insures a consistent high quality display by eliminating the human factor. Also, in thermography, since the prime interest is in maximum or minimum temperatures of the subject, the ABC unit 60 automatically adjusts the brightness control of the display such that the hottest or coldest portions of the subject being thermographed appear on the display at a predetermined brightness level consistent with the dynamic range of said display. To accomplish this, a peak detector circuit 62 is coupled to the output of amplifier 38. The peak detector 62 is provided with blanking pulses from the gating logic 64 which is controlled by the output of amplifier 40, the composite infrared video signal. Accordingly, the peak detector 62 functions to detect the maximum intensity of the scanned scene, and provides a DC output voltage which is proportional to this peak. This output is fed to an error amplifier 66 which also has applied thereto a variable reference voltage 68. The DC output of the error amplifier 66 is applied via a switch 70 to the input of amplifier 36, where it is summed with the infrared video signal to provide the automatic brightness control. The feedback of this loop assures that the peak of the video output is essentially clamped to the predetermined DC level 68. This DC level is adjustable and normally set at the maximum level of the dynamic range of the display. Accordingly, if the IR brightness level of the scene changes, an automatic compensation is provided which accommodates the new scene to the display as if there had been no IR level change. It is also possible to provide a minimum by merely inverting the video signal with an inversion amplifier and detecting the peak, which in this case would be a minimum. Thus either the hottest or the coldest spots in the display are automatically visible without adjustment.

FIG. 2 illustrates one form of ABC unit 60, which has been found suitable for use in the camera chosen for purposes of illustration. However, the parameters which are illustrated, and the circuitry, will depend on the particular camera used, its scanning speed, and other electronic characteristics, and the invention is not considered limited to the particular configuration shown in FIG. 2. The gating logic 64 has the composite video signal from the output of amplifier 40 applied to an input terminal 80. This signal contains the vertical and horizontal blanking signals and also the IR video signal. This signal is applied via a resistor network comprises of resistors 81, 83 and 84 to the base of a transistor 82. Resistors 81 and 83 shift the DC level of the composite signal. This signal is applied to transistor 82 and a diode 85 which is connected between the emitter-base junction of the transistor 82. The diode 85 protects this junction. A resistor 86 is connected between a source of positive potential and to the collector electrode of transistor 82 to provide a bias for the collector. The circuit of transistor 82 functions to separate the blanking signals from the composite signal applied at terminal 80. The transistor 82 is saturated during blanking pulses as its collector is driven to ground potential and during the video portions of the composite infrared video signal the transistor 82 is cut off as the collector voltage approaches power supply voltage through resistor 86. This ground, positive-going signal is applied from the collector of transistor 82 via resistors 87 and 88 to the base electrode of a transistor 90. Transistor 90 is thus caused to be saturated or cut off to act as a video gate. The video signal is applied from the output of amplifier 38 to the input terminal 91, which is the collector of the transistor 90. A diode 89 provides bias for the collector of the transistor 90. When the video gate 90 is closed, at which time transistor 90 is saturated, the video signal is applied to a diode 92. When the video gate is open, thus transistor 90 cutoff, no signal is applied to the diode 92. Accordingly, IR video signals appear across the diode 90 only during the active scan intervals. The diode 92 in combination with a capacitor 93 causes peak detection of the video signal. This peak appears across capacitor 93 and almost instantaneously in view of the low impedance of the transistor 90 during the occurrence of video information. This peak output is applied via a resistor 94 to the input of an amplifier 95 which produces inversion of the ABC voltage. The time constant of the RC circuit 93 and 94 is sufficiently long, in comparison to the time it takes to scan one frame of the picture, for a smooth, stabilized operation. A resistor 96 in combination with resistor 94 shifts the DC level of the ABC signal and a capacitor 97, which is also connected to the input of the amplifier 95, provides stabilization for amplifier 95. The output of amplifier 95 is coupled to the error amplifier 66 via a resistor 98 to the input of amplifier 100, which is also provided with a reference voltage from an adjustable resistor 99 via resistor 101. The reference voltage of resistor 99 provides for shifting the maximum DC level of the ABC voltage. This circuitry forms a part of the error amplifier 66, and the output from the amplifier 100 is applied via resistors 102, 103 and capacitor 104 to the switch 70. These latter elements provide loop gain and frequency stabilization for the error amplifier. When the switch 70 is in the automatic position, the output of the error amplifier is connected to the input of the amplifier 36, which clamps the processing circuitry chain of amplifiers to a DC level corresponding to the peak of the video signal.

As has been indicated, the parameters indicated on the circuit diagram are merely illustrative as being suitable and are given for purposes of disclosure, and the invention is not considered limited thereto, as the particular circuit design will depend on the type of infrared camera which is used. The amplifiers 95 and 100 may be Fairchild integrated circuits 741.

Since in many applications of thermography greatest temperature changes appear at maximum or minimum levels, the present invention offers an advantageous way to have the display show the hottest and coldest portions of the subject by automatically adjusting the brightness control. Accordingly, when any scene is scanned, the hottest or coldest portion will appear automatically at maximum or minimum intensity. Also, whenever the camera is aimed at a scene, a picture will appear at the display without manual adjustments, and a consistent presentation will be possible by eliminating human errors in judgment in setting the brightness. With the automatic brightness control circuit there is no need to know the temperature characteristics of the subject, and no requirement to adjust the brightness level to accommodate the scene. In continual screening processes, such as medical examination or non destructive testing applications, consistent quality displays can be achieved without the loss of vital temperature information because of inept settings and poor judgment in setting the brightness controls.

Since other modifications varied to fit particular operating requirements and environments will be apparent to those skilled in the art, the invention is not considered limited to the examples chosen for purposes of disclosure, and covers all modifications and changes which do not constitute departures from the through spirit and scope of this invention.

I claim:

1. An infrared thermograph having an automatic brightness control comprising, in combination,
   a. an infrared detector for producing signals in accordance with the intensity of infrared radiation applied thereto,
   b. means for scanning said infrared detector over a field of view whereby said infrared detector generates an infrared video signal based on the intensity of infrared radiation in said field of view,
   c. an infrared video signal processing channel having a plurality of amplifiers for processing said infrared video signal in accordance with the requirements of a display means,
   d. a peak detector circuit coupled to the output of one of said plurality of amplifiers for detecting the maximum or minimum intensity of said infrared video signal,
   e. an error amplifier coupled to said peak detector circuit for deriving an automatic brightness control signal in accordance with said maximum or minimum intensity, and f. means for coupling said automatic brightness control signal to the said channel to automatically regulate the brightness of said channel based on the maximum or minimum intensity of said infrared video signal.

2. An infrared thermograph in accordance with claim 1 wherein
   a. said means for scanning said infrared detector provides a raster-type scan,
   b. said peak detector circuit having a time constant sufficiently long to hold the maximum or minimum signal for at least one frame of said raster.

3. An infrared thermograph in accordance with claim 1 wherein
   a. said means for scanning said infrared detector provides a raster-type scan,
   b. means for generating synchronizing pulses in accordance with the scanning of said infrared detector,
   c. means for gating said peak detector circuit with said synchronizing pulses.

4. An infrared detector in accordance with claim 3 wherein said peak detector circuit has a time constant sufficiently long to hold the maximum or minimum peak of said infrared video signal for at least one frame of said raster.

5. An infrared thermograph in accordance with claim 1 wherein said error amplifier has a source of DC reference voltage applied to the input thereof along with the output of said peak detector circuit for algebraically summing the two to produce the automatic brightness control signal at the output thereof.

6. An infrared thermograph in accordance with claim 3 wherein said error amplifier has a source of DC reference voltage applied to the input thereof along with the output of said peak detector circuit for algebraically summing the two to produce the automatic brightness control signal at the output thereof.

7. An infrared thermograph in accordance with claim 4 wherein said error amplifier has a source of DC reference voltage applied to the input thereof along with the output of said peak detector circuit for algebraically summing the two to produce the automatic brightness control signal at the output thereof.